(12) United States Patent
Radloff et al.

(10) Patent No.: US 6,466,728 B1
(45) Date of Patent: Oct. 15, 2002

(54) ATTENUATOR FOR FIBER OPTIC CABLES

(75) Inventors: Georgeanne M. Radloff, Grand Prairie; Janet Bradshaw, Flower Mound, both of TX (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/520,082

(22) Filed: Mar. 8, 2000

(51) Int. Cl.⁷ .................................... G02B 6/00
(52) U.S. Cl. ........................ 385/140; 385/134
(58) Field of Search ................ 385/140, 134, 385/135, 137

(56) References Cited

U.S. PATENT DOCUMENTS

| | | | | |
|---|---|---|---|---|
| 4,697,869 A | * | 10/1987 | So et al. ................... | 350/96.15 |
| 4,721,351 A | * | 1/1988 | Goepfert et al. ......... | 350/96.15 |
| 5,097,529 A | * | 3/1992 | Cobb et al. ................ | 385/135 |
| 5,311,614 A | * | 5/1994 | Caron et al. .............. | 385/140 |
| 5,684,912 A | * | 11/1997 | Slaney et al. ............ | 385/140 |

FOREIGN PATENT DOCUMENTS

| JP | 404026802 A | * | 1/1992 | ............. 385/140 |
|---|---|---|---|---|

* cited by examiner

*Primary Examiner*—Hemang Sanghavi
*Assistant Examiner*—Sung Pak
(74) *Attorney, Agent, or Firm*—Jones, Day, Reavis & Pogue

(57) ABSTRACT

An attenuator on which a fiber optic cable is loopable in a plurality of different configurations to provide incremental attenuation of light signals internally of the cable. The attenuator includes a base having a pair of spaced-apart spools around which a cable is looped in variable configurations to provide variable degrees of attenuation. Cable guide recesses are provided on the base outwardly of the spools, and hollow securing/stacking bosses extend upwardly from the base adjacent its ends.

23 Claims, 4 Drawing Sheets

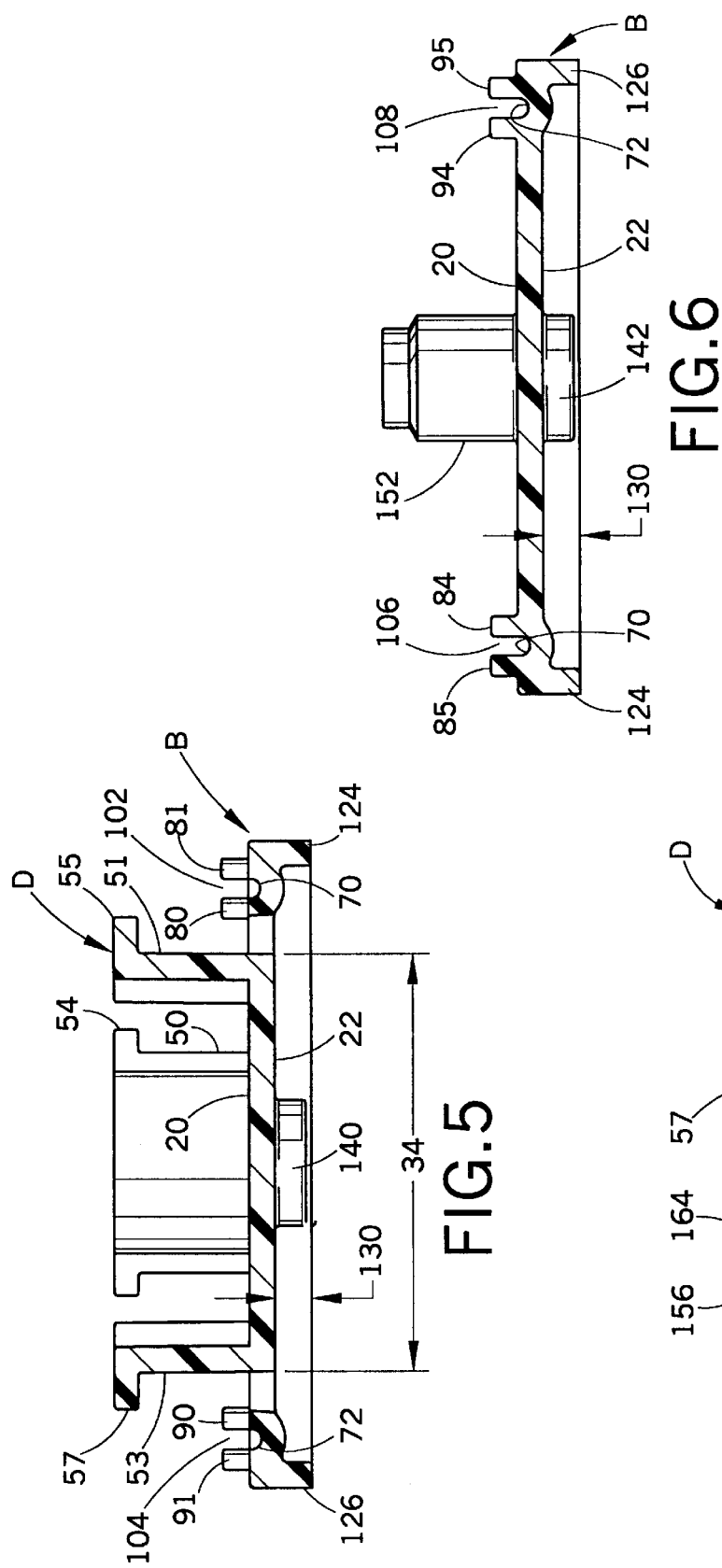

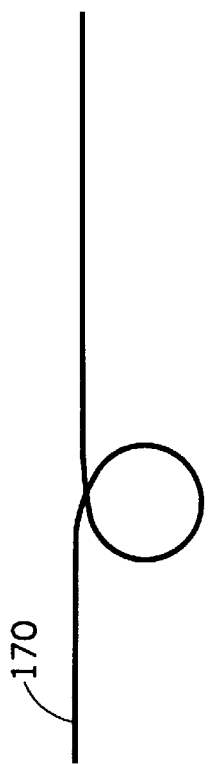
FIG.8
FIG.9
FIG.10
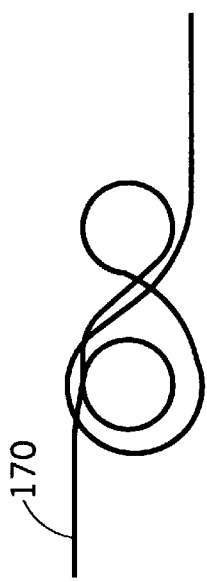
FIG.11
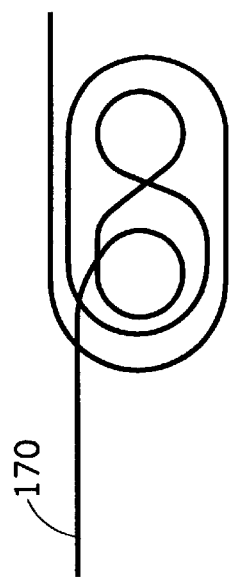
FIG.12

ATTENUATOR FOR FIBER OPTIC CABLES

BACKGROUND OF THE INVENTION

This application relates to the art of attenuators and, more particularly, to attenuators for reducing the intensity of light signals in fiber optic cables. The invention is particularly applicable to attenuation of light signals having a wavelength of 1550μm in fiber optic cable having a diameter of 900μm and will be described with specific reference thereto. However, it will appreciated that the invention has broader aspects and can be used for other wavelengths of light as well as with fiber optic cables having other diameters.

Equipment that is designed to operate on a particular range of light input signals will not operate properly if the input is too high. By way of example, it may be desirable to have an input in the range of 0 to minus 4 dB from a fiber optic cable that actually is delivering plus 1 to minus 3 dB. Therefore, it is necessary to attenuate the signals from the fiber optic input cable to bring them down within the acceptable range.

Many arrangements for light attenuation in fiber optic cables have undesirable insertion losses due to splices, connectors or the manner in which attenuation is achieved, and many of these devices are inserted directly in the path of the signal requiring attenuation. It would be desirable to have an arrangement for incrementally attenuating light signals in fiber optic cables with no insertion losses and with very low polarization dependent losses.

SUMMARY OF THE INVENTION

A light signal attenuator for fiber optic cables in accordance with the present application provides attenuation up to at least 2 dB in at least five increments.

An attenuator in accordance with the present application has a generally rectangular base with opposite ends, opposite sides, and upper and lower surfaces. However, it will be appreciated that other shapes can be used. A pair of cable looping devices or spools extend upwardly from the upper surface of the base for looping a fiber optic cable therearound to obtain a desired attenuation.

In one arrangement, the spools are formed by a plurality of circumferentially-spaced arcuate arms extending upwardly from the upper surface of the base on the periphery of a circle. The spools have spool axes that lie on a common longitudinal axis that extends between the ends of the base and bisects the base between its sides.

A plurality of spaced-apart fiber optic cable guideways in the form of recesses open upwardly of the base in alignment with elongated grooves in the base upper surface adjacent the opposite sides thereof.

Hollow fastening and stacking bosses extend upwardly from the upper surface of the base adjacent the opposite ends thereof. Sockets in the underside of the base in alignment with the fastening and stacking bosses are provided for receiving upper end portions of the bosses on an adjacent tray to provide stackability.

It is a principal object of the present invention to provide an improved light attenuator for use with fiber optic cables.

It is an additional object of the invention to provide such an attenuator that has a pair of cable looping devices thereon.

It is a further object of the invention to provide such an attenuator having cable guideways for guiding a cable in a desired path to and from the looping devices.

It is another object of the invention to provide such an attenuator that is molded in one-piece of plastic material.

It is also an object of the invention to provide such an attenuator that is symmetrical so that either end may function as the entrance or exit end.

BRIEF DESCRIPTION OF THE DRAWING

FIG. 5 is cross-sectional elevational view taken generally on line 5—5 of FIG. 1;

FIG. 6 is a cross-sectional elevational view taken generally on line 6—6 of FIG. 1;

FIG. 7 is a partial cross-sectional elevational view taken generally on line 7—7 of FIG. 1;

FIG. 8 is a plan view showing how a fiber optic cable is looped using the attenuator to obtain an attenuation of approximately 0.52 dB;

FIG. 9 is a plan view showing how a cable is looped using the attenuator to obtain an attenuation of approximately 0.77 dB;

FIG. 10 is a plan view showing how a cable is looped to obtain an attenuation of approximately 1.02 dB;

FIG. 11 is a plan view showing how a cable is looped to achieve an attenuation approximately 1.41 dB; and FIG. 12 is a plan view showing how a cable is looped to obtain an attenuation of approximately 1.85 dB.

DESCRIPTION OF A PREFERRED EMBODIMENT

Figure 1:
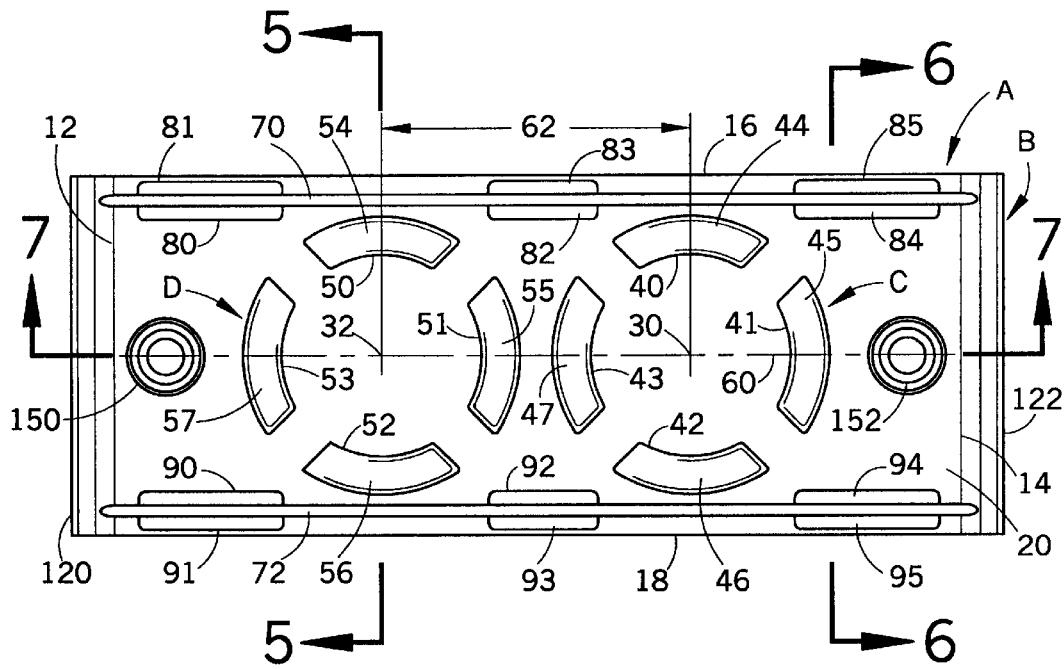
FIG. 1 is a top plan view of an attenuator in accordance with the present application

Referring now to the drawing, wherein the showings are for purposes of illustrating a preferred embodiment of the invention only and not for purposes of limiting same, an attenuator A in accordance with the present application may take many forms and is illustrated as having a generally rectangular base B. The outer periphery of base B is formed by parallel opposite ends 12, 14 and parallel opposite sides 16, 18. Base B also has parallel flat upper and lower surfaces 20, 22.

A pair of spaced-apart cable looping devices C, D extend upwardly from upper surface 18 of base B. The cable looping devices are equivalent to spools around which a fiber optic cable can be looped or coiled. Each looping device or spool has a central axis 30, 32 extending perpendicular to upper surface 20 of base B. As best shown in FIG. 5 for looping device or spool D, each spool has an outer cylindrical diameter 34 of approximately 0.839 inches. Obviously, the dimensions that will be given in this application by way of example may vary considerably without departing from the invention.

Each cable looping device C, D includes a plurality of circumferentially-spaced arcuate arms extending upwardly from upper surface 20 of base B and having outer arm surfaces that lie on the periphery of a cylinder. The arcuate arms are illustrated at 40–43 for looping device C and at 50–53 for looping device D. Each arcuate arm terminates in an outwardly extending flange illustrated at 44–47 for looping device C and at 54–57 for looping device D.

Figure 2:
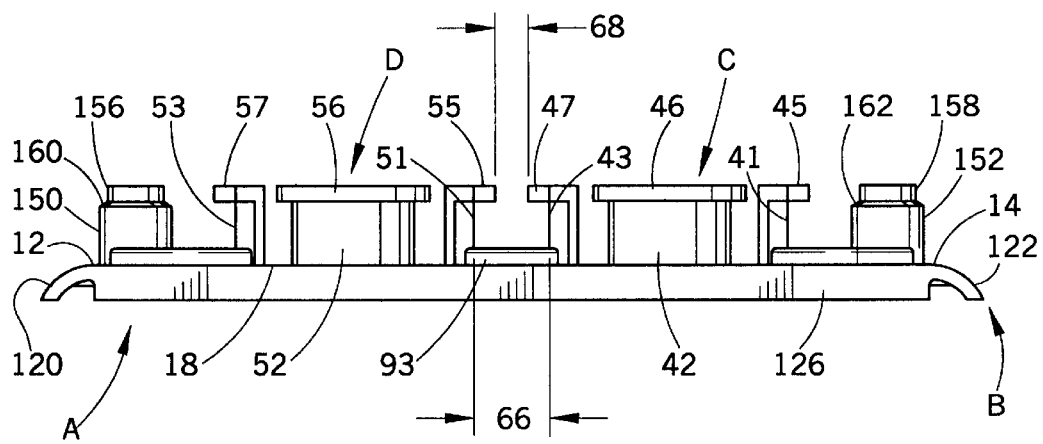
FIG. 2 is a side elevational view thereof.

Central axes 30, 32 of cable looping devices C, D are spaced from one another along a longitudinal axis 60 a distance 62 of approximately 1.125 inches. As shown in FIG. 2, the distance 66 along centerline 60 of FIG. 1 between the outer cylindrical surfaces of looping devices C and D is approximately 0.286 inches. The outer diameter of the flanges is approximately 1.00 inch so that the distance 68 along centerline 60 between the ends of flanges 47 and 55 is approximately 0.125 inches.

In the arrangement shown, there are four arcuate arms and flanges for each cable looping device C, D. Each arm and flange extends over an arc of approximately 60° so that all four arcuate arms and flanges together extend over an arc of approximately 240°. The arcuate arms and flanges are equidistantly spaced circumferentially so that each of the four spaces in each looping device C, D extends over an arc of approximately 30°. The circumferential angle occupied by each arm and its flange preferably is in the range 180–220 percent of the circumferential angle occupied by each space between adjacent arms and flanges.

Figure 3:
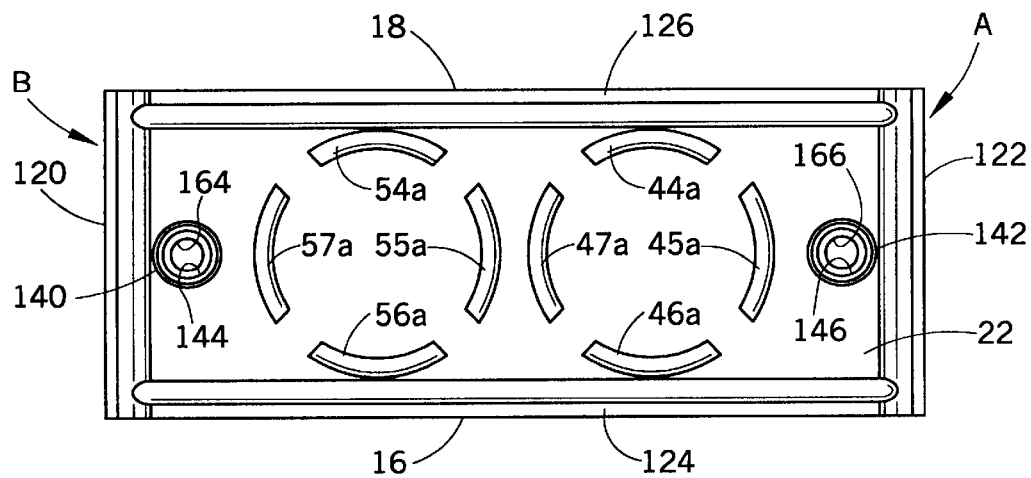
FIG. 3 is a bottom plan view thereof.
Figure 4:
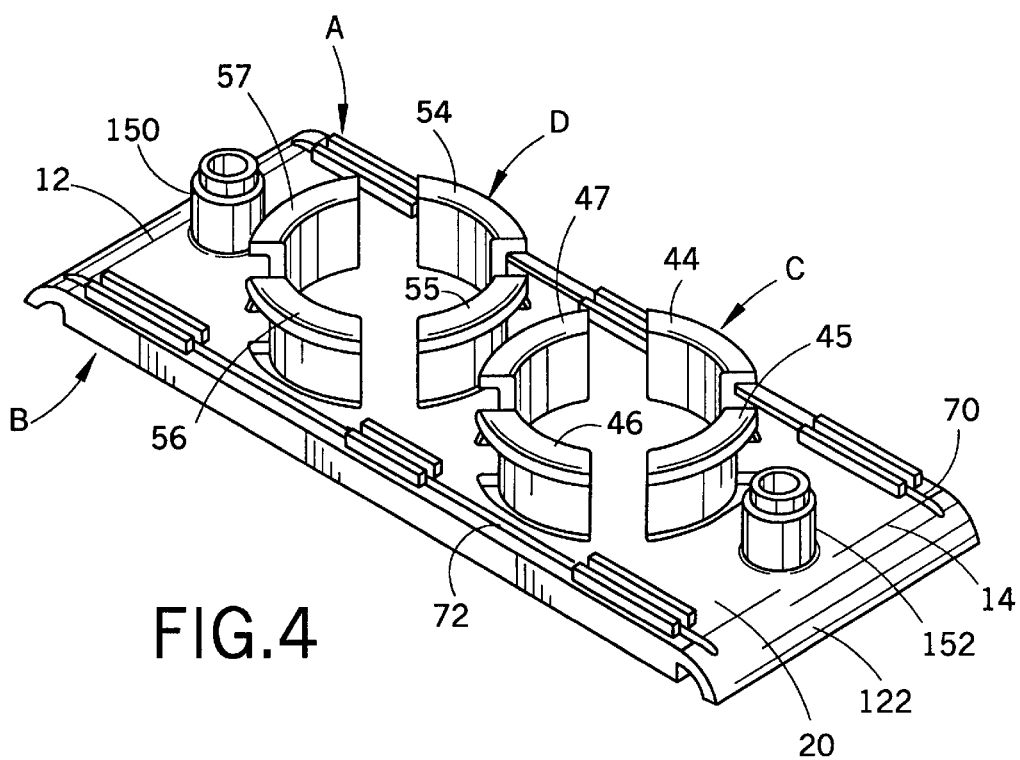
FIG. 4 is a perspective illustration thereof.

The distance from base upper surface 20 to the outer surface of the flanges on the cable looping devices is approximately 0.281 inches. The arcuate openings illustrated at 44a–47a and 54a–57a in FIG. 3 are provided in base B to facilitate molding of flanges 44–47 and 54–57 on the arcuate arms that form cable looping devices C, D.

Upper surface 20 of base B has grooves 70, 72 therein extending along and adjacent to opposite sides 16, 18 the full length of base B between its opposite ends 12, 14. A plurality of pairs of walls extend upwardly from upper surface 20 of base B on opposite sides of grooves 70, 72 to define fiber optic cable receiving recesses therebetween. The upstanding recess forming walls are illustrated at 80 and 81, 82 and 83, and 84 and 85 adjacent side 16 for groove 70. The recess forming walls are illustrated at 90 and 91, 92 and 93, and 94 and 95 adjacent side 18 for groove 72. The recess forming walls extend upwardly from base upper surface 20 a distance of approximately 0.06 inches.

The recesses between the walls are aligned with and overlie grooves 70, 72. These fiber optic cable receiving recesses are indicated at 102 and 104 in FIG. 5 between walls 80, 81 and walls 90, 91. The cable receiving recesses are indicated at 106 and 108 in FIG. 6 between recess forming walls 84, 85 and 94, 95. As indicated in FIG. 6, the sides of the recesses converge slightly in a direction toward grooves 70, 72 so that the angle between the recess sides is approximately 5°. It will be recognized that corresponding cable receiving recesses are provided between walls 82, 83 and 92, 93.

Grooves 70, 72 are curved at a radius of approximately 0.02 inch so that they have a width of approximately 0.04 inch. The sidewalls of the recesses then extend upwardly from the sides of the grooves and diverge at an included angle of approximately 5°.

Groove 70 and the cable receiving recesses associated therewith are located intermediate base side 16 and the outer cylindrical surfaces of arcuate arms 40, 50 of cable looping devices C, D. Likewise, groove 72 and the cable receiving recesses associated therewith are located intermediate base side 18 and the outer cylindrical surfaces of arcuate arms 42, 52 on cable looping devices C, D. The recesses provided between walls 80, 81 and 90, 91 are located between central axis 32 of looping device D and base end 12. Likewise, the recesses formed between walls 84, 85 and 94, 95 are located between central axis 30 of looping device C and base end 14.

The grooves and recesses all extend parallel to longitudinal axis 60. The recesses provided between walls 82, 83 and 92, 93 span the space between looping devices C, D.

Thus, as shown in FIG. 2 for recess forming wall 93, the length of the wall and its corresponding recess parallel to longitudinal axis 60 is greater than spacing 66 between the facing outer cylindrical surfaces of the cable looping devices. The length of each of recess forming wall 80, 81, 84, 85, 90, 91 and 94, 95 is approximately 0.50 inches. The length of each of recess forming wall 82, 83 and 92, 93 is approximately 0.375 inches.

Base B has support legs extending downwardly therefrom, and include opposite end legs 120, 122 and opposite side legs 124, 126. The terminal ends of the support legs lie in a common support plane parallel to base lower surface 22 for supporting base B with lower surface 22 thereof spaced above a flat support surface. Thus, there is a hollow space generally indicated at 130 in FIGS. 5–7 that is formed between the support plane and base lower surface 22. Socket forming projections 140, 142 extend into space 130 from base lower surface 22 as shown in FIGS. 5–7. Each of socket forming projections 140, 142 has a downwardly opening socket therein as indicated at 144 for socket forming projection 140 in FIG. 7. It will be recognized that socket forming projection 142 has a corresponding downwardly opening socket as generally indicated at 146 in FIG. 3.

A securing and stacking boss 150, 152 extends upwardly from base upper surface 20 adjacent each end 12, 14 on longitudinal centerline 60.

Boss 150 is located between cable looping device D and end 12, while boss 152 is located between cable looping device C and end 14. Although the bosses may take many forms, they are generally cylindrical in the form illustrated.

Outer or terminal end portions 156, 158 of bosses 150, 152 have a reduced diameter to provide stacking shoulders 160, 162. Hollow bosses 150, 152 have circular holes 164, 166 therethrough for receiving suitable fasteners to secure one or more attenuators to a support surface. The outer diameter of a boss end portion 156, 158 is approximately the same as the inner diameter of a cylindrical socket 144, 146 so that the boss end portions are a close fit within the sockets. Thus, a plurality of attenuator devices are stackable on top of one another by inserting the upper end portions of the bosses on a lower attenuator within the sockets on an upper attenuator. This projection and socket arrangement stabilizes a plurality of stacked attenuators and assists in holding them together with holes 164, 166 in alignment.

The attenuation obtained using a 900 $\mu$m diameter fiber optic cable and a wavelength of 1550 $\mu$m is indicated by way of example in FIGS. 8–12. In FIG. 8, cable 170 extends through recess forming walls 80, 81 and then loops around looping device D followed by exiting through the recesses provided between walls 82, 83 and 84, 85.

In the arrangement of FIG. 9, cable 170 extends through the recess between walls 80, 81, loops around looping device D one turn, and then extends between looping devices C, D to the opposite side of the attenuator base to exit through the recess provided between walls 94, 95.

In FIG. 10, cable 170 extends through the recess between walls 80, 81 and loops around looping device D. Cable 170 then extends between looping devices C, D to the opposite side of the attenuator base and is looped counterclockwise around looping device C followed by exiting through the recess provided between walls 94, 95.

In FIG. 11, a cable 170 extends through the recess between walls 80, 81, loops clockwise around looping device D, extends between looping devices C, D to the opposite side of the attenuator base, loops counterclockwise around looping device C, loops again clockwise around looping device D, extends between the looping devices to the opposite side of the base and exits through the recess provided between walls 94, 95.

In FIG. 12, cable 170 extends through the recess between walls 80, 81 and clockwise around looping device D, then between looping devices C, D to the opposite side of the attenuator base, counterclockwise around looping device C, back between looping devices C, D to the opposite side of the attenuator base, then loops around both of looping devices C, D while exiting through the recesses between walls 82, 83 and 84, 85.

It will be recognized that the attenuator may be repositioned end-for-end so that the cable would enter through the recess between walls 94, 95 instead of between walls 80, 81. The combined depth of the grooves and recesses is greater than two times the external diameter of a fiber optic cable used with the attenuator device so that a cable may pass through a recess more than once and still be received therein between the walls that form the recess. In other words, the combined depth of a recess and groove is greater than two times the width of a recess.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. An attenuator for fiber optic cables comprising: a base having a pair of spaced-apart-cable looping devices upstanding therefrom, cable guides on said base outwardly of said looping devices on opposite sides thereof, and said cable looping devices having a cable receiving space therebetween through which a cable is extendable directly from one side of one of said cable looping devices to an opposite side of the other of said cable looping devices.

2. The attenuator of claim 1 wherein each of said cable looping devices has a central axis, a longitudinal axis extending through said central axis of both of said cable looping devices, and said cable guides being elongated in a direction parallel to said longitudinal axis.

3. The attenuator of claim 1 wherein said base has an upper surface and said cable guides include grooves in said upper surface outwardly of said cable looping devices.

4. The attenuator of claim 1 including hollow bosses extending upwardly from said base, said bosses having stepped end portions that provide stacking support shoulders.

5. The attenuator of claim 1 wherein said cable looping devices provide at least five different attenuation values between 0.4 dB and 2 dB.

6. The attenuator of claim 5 wherein said looping devices provide a total attenuation of up to at least 2 dB in at least five increments.

7. The attenuator of claim 1 wherein said base has opposite ends and opposite sides, and a hollow boss upstanding from said base adjacent each of said ends.

8. The attenuator of claim 7 wherein said base has an underside and each said boss has a socket aligned therewith on said underside, and each said boss having a boss end portion receivable in each of said sockets to provide stackability of a plurality of attenuators.

9. The attenuator of claim 1 wherein said base has an upper surface and opposite sides and said cable guides comprise a plurality of spaced-apart cable receiving recesses extending along said sides.

10. The attenuator of claim 9 wherein said base has a plurality of pairs of spaced-apart walls extending upwardly therefrom and between which said cable receiving recesses are formed.

11. The attenuator of claim 1 wherein said looping devices comprise cylindrical spools.

12. The attenuator of claim 11 wherein said spools are circumferentially interrupted by a plurality of circumferentially-spaced openings.

13. The attenuator of claim 11 wherein said spools are formed by a plurality of circumferentially-spaced arcuate arms extending upwardly from said base, said arms for each of said spools having arm outer surfaces that lie on the periphery of a cylinder, and each of said arms having an outer end with an outwardly extending flange thereon.

14. A stackable attenuator for fiber optic cables comprising a base having upper and lower surfaces and an outer periphery that includes opposite ends and opposite sides, a cable looping device extending upwardly from said upper surface, hollow bosses extending upwardly from said upper surface adjacent said ends, support feet projecting downwardly from said periphery for supporting said base on a support surface, said support feet having support feet ends lying in a support plane and said lower surface of said base being spaced above said support plane to define a space between said support plane and said lower surface of said base, socket forming projections extending downwardly from said lower surface into said space in alignment with said bosses, said socket forming projections having downwardly opening sockets therein, and said bosses having outer end portions shaped and dimensioned for close reception in said sockets.

15. The attenuator of claim 14 including a plurality of cable receiving recesses on said upper surface of said base, said cable receiving recesses being spaced-apart along and adjacent to said base sides outwardly of said cable looping device.

16. The attenuator of claim 15 wherein said upper surface has grooves therein aligned with said cable receiving recesses and extending the length of said base between said opposite ends.

17. The attenuator of claim 14 wherein said cable looping device comprises at least one spool.

18. The attenuator of claim 17 wherein said spool is formed by a plurality of circumferentially-spaced arcuate spool arms extending upwardly from said upper surface of said base, and each of said spool arms terminating in an outwardly extending flange.

19. The attenuator of claim 18 wherein said spool arms have circumferential spaces therebetween and each of said spool arms extends over a circumferential angle that is at least 150% of the circumferential angle over which each of said circumferential spaces extend.

20. An attenuator for fiber optical cables that provides a total attenuation internally of the cable of up to at least 2 dB in at least five increments by forming controlled loops in the cable, said attenuator having a pair of spaced-apart spools around which the cable is loopable, and said spools having a cable receiving space therebetween through which a cable is extendable directly from one of said spools to the other and back again from said other spool to said one spool.

21. The attenuator of claim 20 wherein each of said spools has a diameter of approximately 0.839 inches.

22. The attenuator of claim 21 wherein each of said spools has a spool axis and said spool axes are spaced-apart approximately 1.125 inches.

23. An attenuator for fiber optic cables comprising: a base having a pair of spaced-apart spools upstanding therefrom, said base having opposite base sides and opposite base ends, said spools being aligned with one another in a direction between said opposite base ends, cable guides extending along said base adjacent said opposite base sides in a direction between said opposite base ends, said spools having a cable receiving space therebetween through which a cable is extendable directly from one spool to the other in a direction from one of said base sides toward the other of said base sides, whereby a cable is loopable around one of said spools and extendable through said space between said spools for looping around the other of said spools and then being extended back through said space between said spools to said one spool.

* * * * *